(12) United States Patent
Perks

(10) Patent No.: US 6,532,487 B1
(45) Date of Patent: *Mar. 11, 2003

(54) METHOD AND SYSTEM FOR MANAGING SEMAPHORES IN AN OBJECT-ORIENTED MULTI-TASKING COMPUTER SYSTEM

(75) Inventor: Michael A. Perks, Lake Worth, FL (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1351 days.

(21) Appl. No.: 08/566,638

(22) Filed: Dec. 4, 1995

(51) Int. Cl.[7] ................................................. G06F 9/00
(52) U.S. Cl. ........................ 709/106; 709/100; 709/312; 709/313; 712/203
(58) Field of Search ................................. 395/676, 680, 395/683, 614; 709/100, 101, 102, 103, 104, 105, 106, 312, 313, 314, 315; 712/13, 203

(56) References Cited

U.S. PATENT DOCUMENTS

| | | |
|---|---|---|
| 4,318,182 A | 3/1982 | Bachman et al. |
| 4,320,451 A | 3/1982 | Bachman et al. |
| 4,925,311 A | 5/1990 | Neches et al. |
| 4,928,222 A | 5/1990 | Vriezen et al. |
| 4,965,718 A | 10/1990 | George et al. |
| 5,050,070 A | 9/1991 | Chastain et al. |
| 5,057,996 A * | 10/1991 | Cutler et al. ................. 364/200 |
| 5,159,686 A | 10/1992 | Chastain et al. |
| 5,230,047 A | 7/1993 | Frey, Jr. et al. |
| 5,369,766 A | 11/1994 | Nakano et al. |
| 5,379,432 A | 1/1995 | Orton et al. |
| 5,394,551 A * | 2/1995 | Holt et al. ................... 395/725 |
| 5,404,529 A | 4/1995 | Chernikoff et al. |
| 5,430,850 A | 7/1995 | Papadopoulos et al. |
| 5,434,975 A | 7/1995 | Allen |

OTHER PUBLICATIONS

Decouchant et al., A Synchronization Mechanism for an Object–Oriented Distributed System, Dist. Comp. Systems 1991 Int. Conf., 1991.*

Booch, Grady, Object Oriented Analysis and Design, 1994 pp. 88–89, 360–365.*

* cited by examiner

Primary Examiner—Majid Banankhah
(74) Attorney, Agent, or Firm—Jeffrey S. LaBaw; Bracewell & Patterson, L.L.P.

(57) ABSTRACT

A semaphore manager data structure for managing semaphores in a multi-tasking computer system is disclosed. The data structure comprises of a multiple of indices corresponding to each class, a multiple of semaphore numbers corresponding to each semaphore, and a mapping table defining an assignment of each of the semaphores to each of the classes by utilizing the class indices and the semaphore numbers. The assignment criteria is that a class can only be assigned to one semaphore but a semaphore can be assigned to more than one class.

14 Claims, 7 Drawing Sheets

METHOD AND SYSTEM FOR MANAGING SEMAPHORES IN AN OBJECT-ORIENTED MULTI-TASKING COMPUTER SYSTEM

BACKGROUND OF THE INVENTION

1. Technical Field

The present invention relates to a method and system for data processing in general, and in particular to a method for processing semaphores within a computer system. Still more particularly, the present invention relates to a method for managing semaphores in an object-oriented multi-tasking computer system.

2. Description of the Prior Art

A typical multi-tasking computer system has the capability of performing several processes in parallel. However, despite all its advantages, a multi-tasking computing environment also presents its own set of problems, primarily centered around the scheme of data protection from concurrent processes (or threads) that attempt to modify data that is shared by these processes. The traditional method for data protection within a multi-tasking environment is by utilizing a semaphore.

A semaphore is a flag variable commonly employed for maintaining the executing order among several concurrent processes that are competing for the utilization of critical resources, such as shared data or processor time. For example, a process executing within a processor can exclude all other processes from accessing some shared data by utilizing a process interlocking semaphore. The process interlocking semaphore should be set only before any access to the shared data and should be released only after all accesses to the shared data are complete. Otherwise, the exclusive access to the shared data may not be guaranteed. The traditional semaphore and its usage are described in more detail in Section 5.33 of *Structured Computer Organization* by Andrew Tanenbaum, which is incorporated herein by reference.

Figure 7:
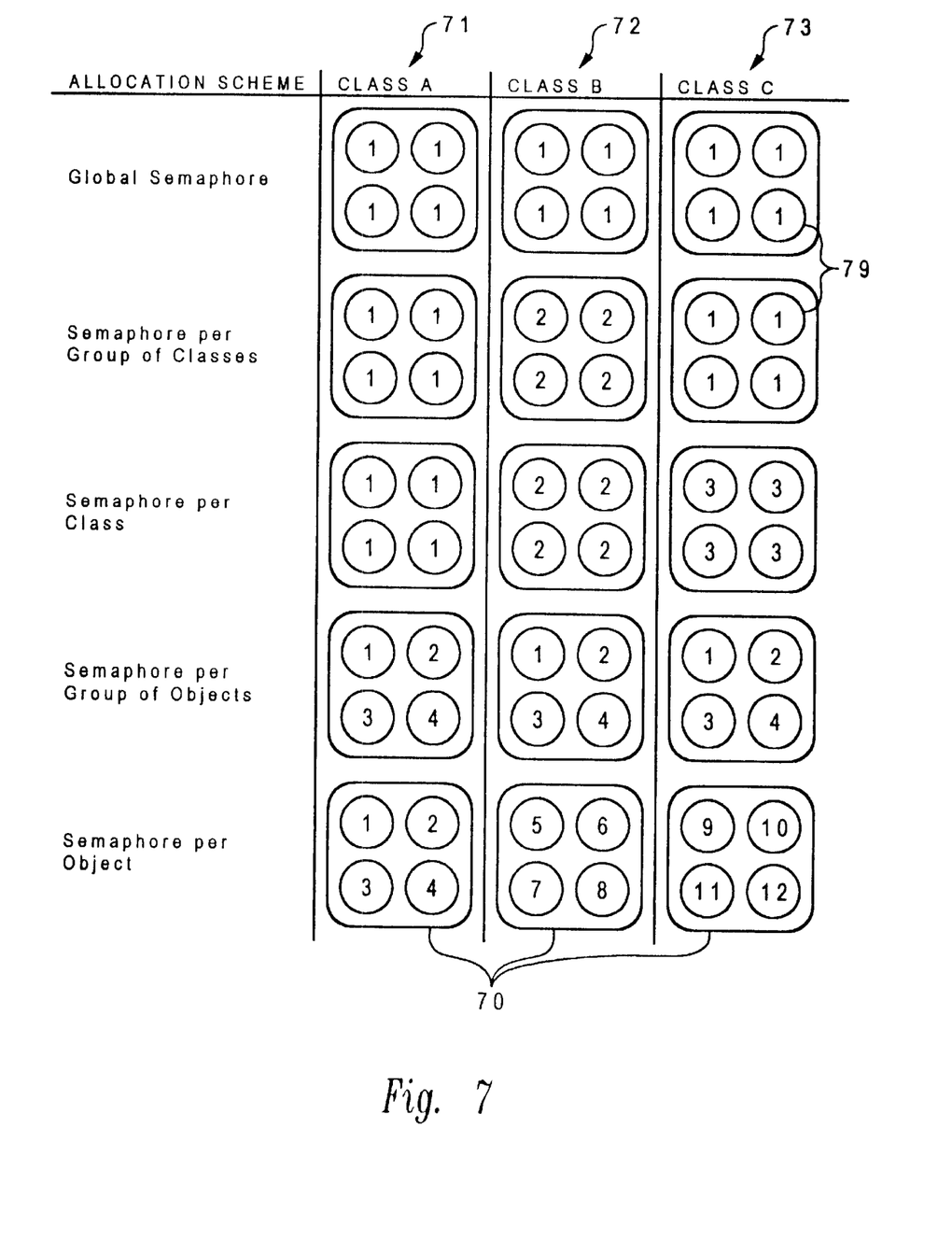
FIG. 7 is a diagram illustrating five different methods of allocating semaphores in an object-oriented computer system.

In order to take advantage of the multi-tasking capabilities, many object-oriented systems that were designed to run as a single execution unit today will soon be migrated towards a multi-tasking computing environment. Within an object-oriented computing environment, there are at least five different schemes of allocating semaphores to classes and objects: (1) one global semaphore, (2) one semaphore per group of classes, (3) one semaphore per class, (4) one semaphore per group of objects, and (5) one semaphore per object. Each of the five different semaphore allocation schemes is depicted in FIG. 7. In the example shown in FIG. 7, there are three classes—Class A 71, Class B 72 and Class C 73. Each class is denoted by box 70; and within each class there are four objects, each denoted by circle 79. Within circle 79 is a number, ranging from 1 to 12, which corresponds to a physical semaphore.

Under the one global semaphore method, as shown in FIG. 7, all classes and objects share a common semaphore 1. Under the one semaphore per group of classes method, certain classes are grouped together to share a common semaphore. For example, both Class A 71 and Class C 73 share semaphore 1. Under the one semaphore per class method, each class has a unique semaphore. For example, Class A 71 utilizes semaphore 1, Class B 72 utilizes semaphore 2 and Class C 73 utilizes semaphore 3. The one semaphore per group of objects method is similar to the one semaphore per group of classes method except that the grouping is by objects instead of classes. Finally, under the one semaphore per object method, each object has a semaphore of its own. For example, each of the twelve objects has a unique semaphore represented by a number ranging from 1 to 12.

These different semaphore allocation schemes can be viewed in terms of a granularity scale, with the single global semaphore method as the least granular and the one semaphore per object method as the most granular. The rest of the allocation schemes lie somewhere in the middle of the granularity scale. Incidentally, the most desirable allocation scheme would consist of not too many semaphores such that deadlock may become a problem and not too few semaphores such that concurrency may be limited (or no concurrency at all as in the case of the single global semaphore method).

In an object-oriented system, because data has already been nicely encapsulated within an object, it is only natural to simply add a semaphore to each object to protect its instance data accordingly. However, under this allocation scheme of one semaphore per object, the number of semaphores may grow so fast that it can become unmanageable quite rapidly. For example, in a reasonably sized object-oriented computer system, the number of objects can be in the range of thousands such that thousands of semaphores would be required. This large amount of semaphores would no doubt increase the chance for deadlock tremendously.

Consequently, it would be desirable to provide a flexible method for managing semaphores in a multi-tasking computer system. This invention can be utilized in any object-oriented multi-tasking computing environment to provide a flexible scheme for allocating semaphores to balance multi-tasking concurrency performance and deadlock potential.

SUMMARY OF THE INVENTION

In view of the foregoing, it is therefore an object of the present invention to provide a method and system for data processing.

It is another object of the present invention to provide a method and system for processing semaphores within a computer system.

It is yet another object of the present invention to provide a method and system for managing semaphores in an object-oriented multi-tasking computer system.

In accordance with the method and system of the present invention, management of semaphores may be implemented in the form of a semaphore manager data structure. The data structure comprises a multiple of indices corresponding to each class, a multiple of semaphore numbers corresponding to each semaphore, and a mapping table defining an assignment of the semaphores to each of the classes by utilizing the class indices and semaphore numbers. The assignment criteria is such that a class can only be assigned to one semaphore but a semaphore can be assigned to more than one class. The advantages of the data structure include the number of actual semaphores that can be controlled so that the computer system would not be overwhelmed, the semaphore mapping can be performed statically at time of compilation or dynamically during time of execution, potential deadlock situations can be reduced due to the assurance that only one class can request one semaphore at a time, and the semaphore tracing or debugging capabilities can be enhanced because all semaphores are managed centrally.

All objects, features and advantages of the present invention will become apparent in the following detailed written description.

BRIEF DESCRIPTION OF THE DRAWINGS

The invention itself as well as a preferred mode of use, further objects and advantage thereof, will best be understood by reference to the following detailed description of an illustrative embodiment when read in conjunction with the accompanying drawings, wherein.

DETAILED DESCRIPTION OF PREFERRED EMBODIMENT

The present invention may be executed in a variety of computers under a number of different operating systems or application programs. The computer may be, for example, a personal computer, a mini-computer or a main frame computer. In addition, the computer may be a stand-alone system or part of a network such as local area network (LAN) or wide area network (WAN). For the purpose of illustration only, the present invention as described below is implemented in an operating system such as OS/2 Warp™ which is manufactured by International Business Machines, Inc. It will be understood, however, that the present invention can be implemented on any other operating systems, application programs or class libraries.

Figure 1:
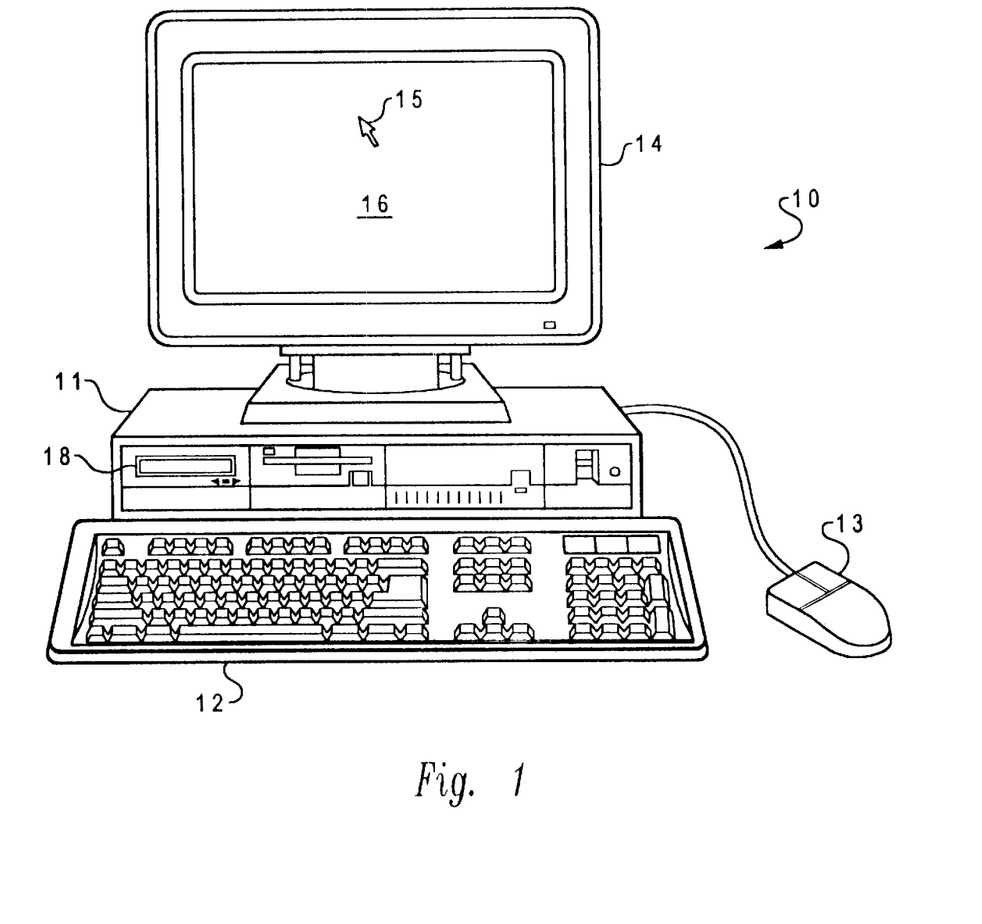
FIG. 1 is a pictorial diagram of a personal computer which utilizes an operating system having the present invention incorporated within.

Referring now to the drawings and in particular to FIG. 1, there is depicted a diagram of personal computer 10 which utilizes an operating system having the present invention incorporated within. Personal computer 10 comprises processor unit 11, keyboard 12, mouse 13 and video display (or monitor) 14. Keyboard 12 and mouse 13 constitute user input devices, and video display 14 constitutes an output device. Mouse 13 is utilized to control cursor 15 displayed on screen 16 of video display 14. Personal computer 10 supports a Graphic User Interface (GUI) which allows a user to "point-and-shoot" by moving cursor 15 to an icon or specific location on screen 16 via mouse 13 and then press one of the buttons on mouse 13 to perform a user command.

Figure 2:
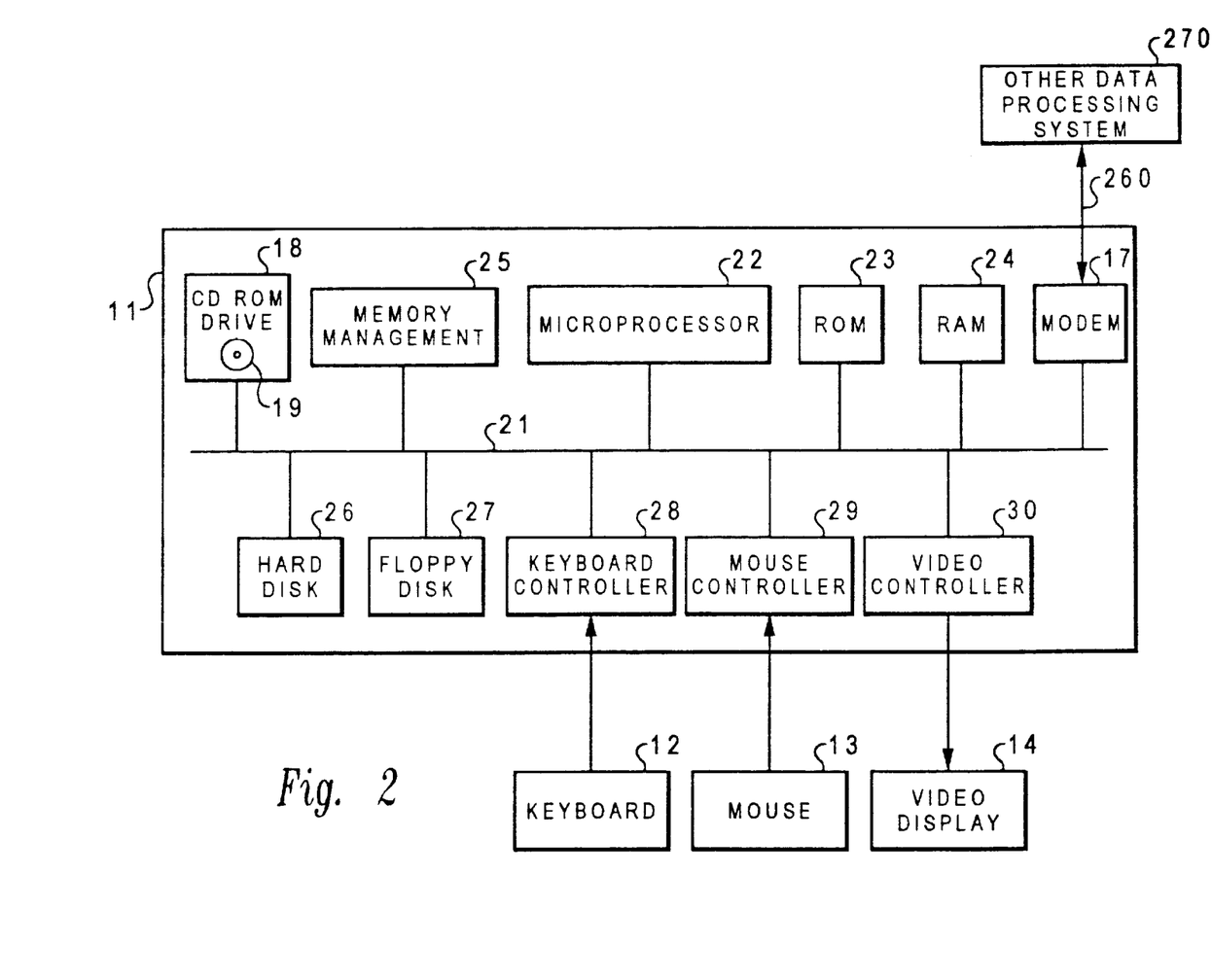
FIG. 2 is a block diagram of the components for the personal computer depicted in FIG. 1.

Referring now to FIG. 2, there is illustrated a block diagram of the components for personal computer 10 of FIG. 1. Processor unit 11 includes system bus 21 to which various components are attached and by which communications among various components is accomplished. Microprocessor 22, connecting to system bus 21, is supported by read only memory (ROM) 23 and random access memory (RAM) 24, both of which are also connected to system bus 21. Microprocessor 22 in the International Businesses Machines, Inc. PS/2™ series of computers is one of the Intel® 80×86 family of microprocessors, but other microprocessors including the Motorola® family of microprocessors, such as 68000, 68020 or 68030, manufactured by Hewlett Packard, Inc.; Sun Microsystems, Intel, Inc.; Motorola, Inc.; and others may also be applicable.

ROM 23 contains, among other codes, the Basic Input/Output System (BIOS) which controls certain basic hardware operations, such as interactions of hard disk 26 and floppy disk 27. RAM 24 is the main memory within which the operating system having the present invention incorporated and other application programs are loaded. A memory management device 25 is connected to system bus 21 for controlling all Direct Memory Access (DMA) operations such as paging data between RAM 24 and hard drive 26 or floppy disk drive 27.

As shown in FIG. 2, a CD ROM drive 18 having a compact disk 19 inserted inside is installed within processor unit 11. However, several other peripherals, such as optical storage media, printers, etc., may also be added to personal computer 10. Further, a modem 17 may be utilized to communicate with other data processing systems 270 across communications line 260.

To complete the description of processor unit 11, there are three input/output (I/O) controllers, namely, keyboard controller 28, mouse controller 29 and video controller 30, all of which are connected to system bus 21. As their names imply, keyboard controller 28 provides the hardware interface for keyboard 12, mouse controller 29 provides the hardware interface for mouse 13, and video controller 30 provides the hardware interface for video display 14.

The hardware setup illustrated in FIGS. 1 and 2 is typical but may vary for a specific application. For the purpose of this disclosure, it is assumed that the operating system for personal computer 10 supports a multi-tasking computing environment, and a preferred embodiment of the present invention is an enhancement to the operating system. Nevertheless, the present invention of a semaphore manager can be implemented in a dynamic link library (DLL) or embedded within the source code of any software program.

Although there are at least five different schemes for allocating semaphores in an object-oriented computing environment as mentioned previously, the present invention is preferably restricted to the first three methods such that the semaphore per group of objects method and the semaphore per object method are not applicable in this design. In this preferred embodiment of the invention, if the number of classes within the computing environment becomes too high, which implies the number of semaphores also becomes high, certain classes may be grouped to share one semaphore. In a preferred embodiment of the semaphore manager design within an object-oriented computer system, there are two additional classes, namely, a semaphore class and a semaphore manager class.

Semaphore Class

The semaphore class provides at least four methods: (1) Constructor, (2) Destructor, (3) Request, and (4) Release. The constructor creates a semaphore. The destructor deletes the semaphore. The Request method requests the semaphore with a time-out, and the Release method releases the semaphore.

The specific implementation of the semaphore class is system dependent, however, a semaphore that can be requested more than once by the same process is required.

Semaphore Manager Class

The semaphore manager class also provides at least four methods: (1) Constructor, (2) Destructor, (3) RequestSem, and (4) ReleaseSem. The constructor method creates a collection of semaphores and initiates each semaphore. The destructor method deletes each semaphore within the collection. The RequestSem method requests a semaphore for a given class, and the ReleaseSem method releases the semaphore for that given class.

As with the semaphore class, the implementation of semaphore manager class is also system dependent. Also, a semaphore that can be requested more than once from the same process is required.

Semaphore Manager Class—Data Structure

The semaphore manager contains a collection of semaphores and a reserved semaphore for control access of the semaphore mapping table within the semaphore manager. The semaphore mapping table is for the mapping of actual virtual to physical semaphore. The following is an example of the data structure for the semaphore manager class.
// constants defining index for each class [section 1]
const Class__SemaphoreManager=0; // reserved
const Class__MyClass1=1;
const Class__MyClass2=2;
const Class__MyClass3=3;
const Class__MyClass4=4;
const Class__MyClass5=5;
// number of classes in mapping table [section 2]
const SEM__MaxClass=Class__MyClass5+1;
// semaphore utilized by semaphore manager [section 3]
const SEM__SemaphoreManager=0;
// list of semaphores utilized in mapping table [section 4]
const SEM__NOSEM=0; // no semaphore used
const SEM__1=1; // used for MyClass3
const SEM__2=2; // used for MyClass1, MyClass2, MyClass5
const SEM__3=3; // used for MyClass4
// maximum number of semaphores utilized by mapping table [section 5]
const SEM__MAX=SEM__3+1;
// mapping table [section 6]
const SEM__MAP[SEM__MaxClass]=
{SEM__SemaphoreManager, // semaphore manager
　　SEM__2, // SEM__MyClass1
　　SEM__2, // SEM__MyClass2
　　SEM__1, // SEM__MyClass3
　　SEM__3, // SEM__MYClass4
　　SEM__2, // SEM__MyClass5};

In section 1 of the example, an unique index number is assigned to each class. The total number of classes is application dependent, and in this example, there are five classes. Each of the five classes are assigned with an unique index number; while index 0 is specifically reserved for the semaphore manager. In section 2, the variable (SEM__MaxClass) for the maximum number of classes in the mapping table is set to equal to the number of classes defined above, plus one for the semaphore manager. In section 3, the semaphore utilized by the semaphore manager is set to 0; and in section 4, the rest of the semaphores are assigned a semaphore number accordingly. The total number of semaphores utilized in the mapping table is application dependent, and in this example, there are four semaphores, including the semaphore manager semaphore 0, as defined in section 3. In section 5, the maximum number of semaphores utilized in the mapping table is set to equal to the number of semaphores defined in section 4. In the mapping table of section 6, each class is assigned with a semaphore accordingly. Except for the semaphore manager semaphore, which is reserved for the semaphore manager class exclusively, each class can be assigned to only one semaphore, while each semaphore can be assigned to more than one class. All semaphores other than the semaphore manager semaphore can be assigned statically or dynamically.

Semaphore Manager Class—Constructor

Figure 3:
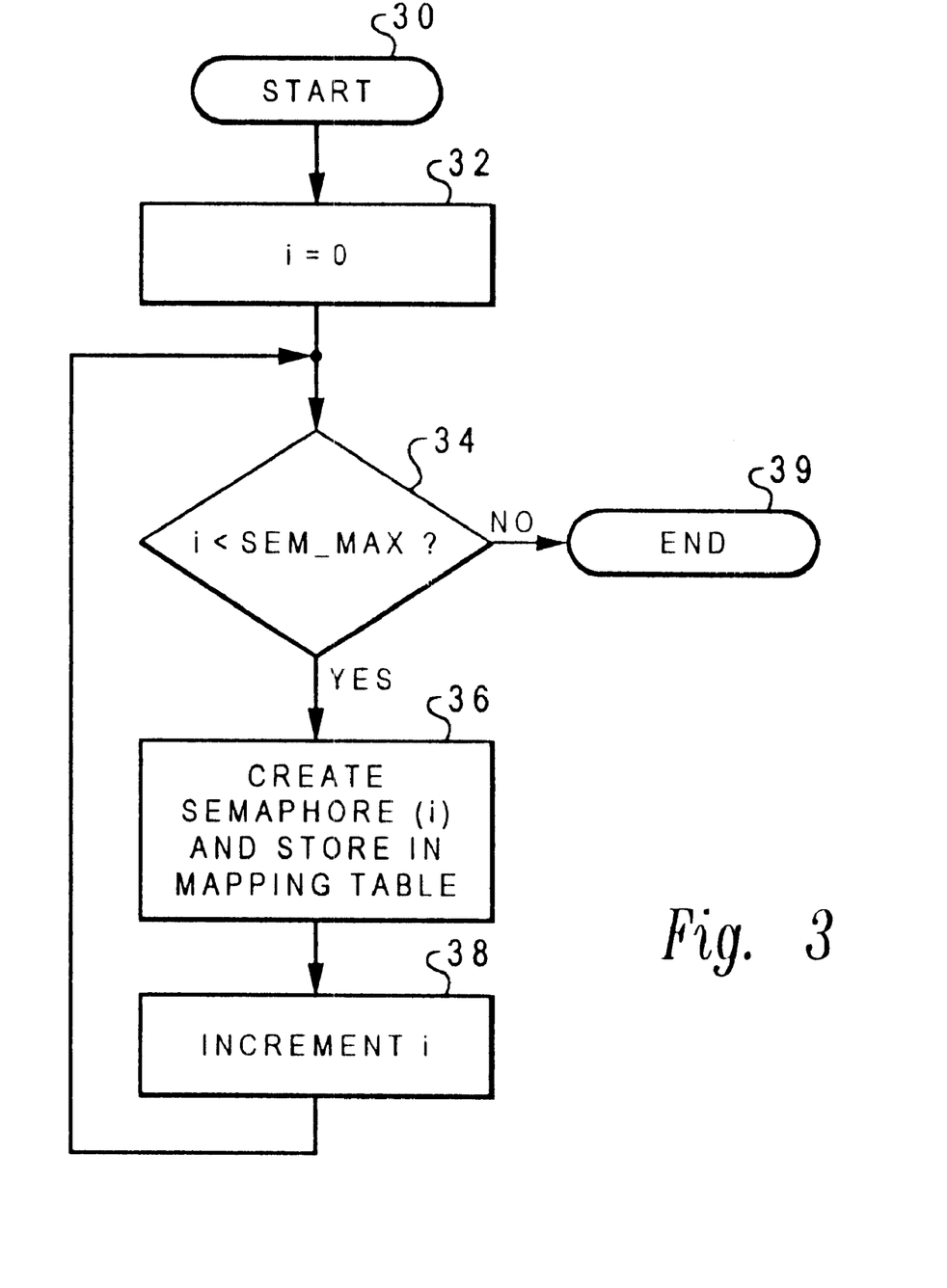
FIG. 3 is a high level logic flow diagram of a constructor method within the semaphore manager according to a preferred embodiment of the invention.

Referring now to FIG. 3, there is depicted a high level logic flow diagram of the constructor method for the semaphore manager class according to a preferred embodiment of the invention. The purpose of the constructor method is for initializing the objects of the semaphore manager class. Starting at block 30, an integer count i is set to zero at block 32. A determination is then made, at block 34, as to whether or not the maximum number of semaphores (SEM__MAX) has been reached. If the maximum number of semaphores has been reached, then the constructor method exits at block 39, otherwise, a new semaphore, e.g. semaphore(i), is created and stored in the mapping table at block 36. Finally, the integer count i is incremented at block 38, and the process returns to block 34.

Semaphore Manager Class—Destructor

Figure 4:
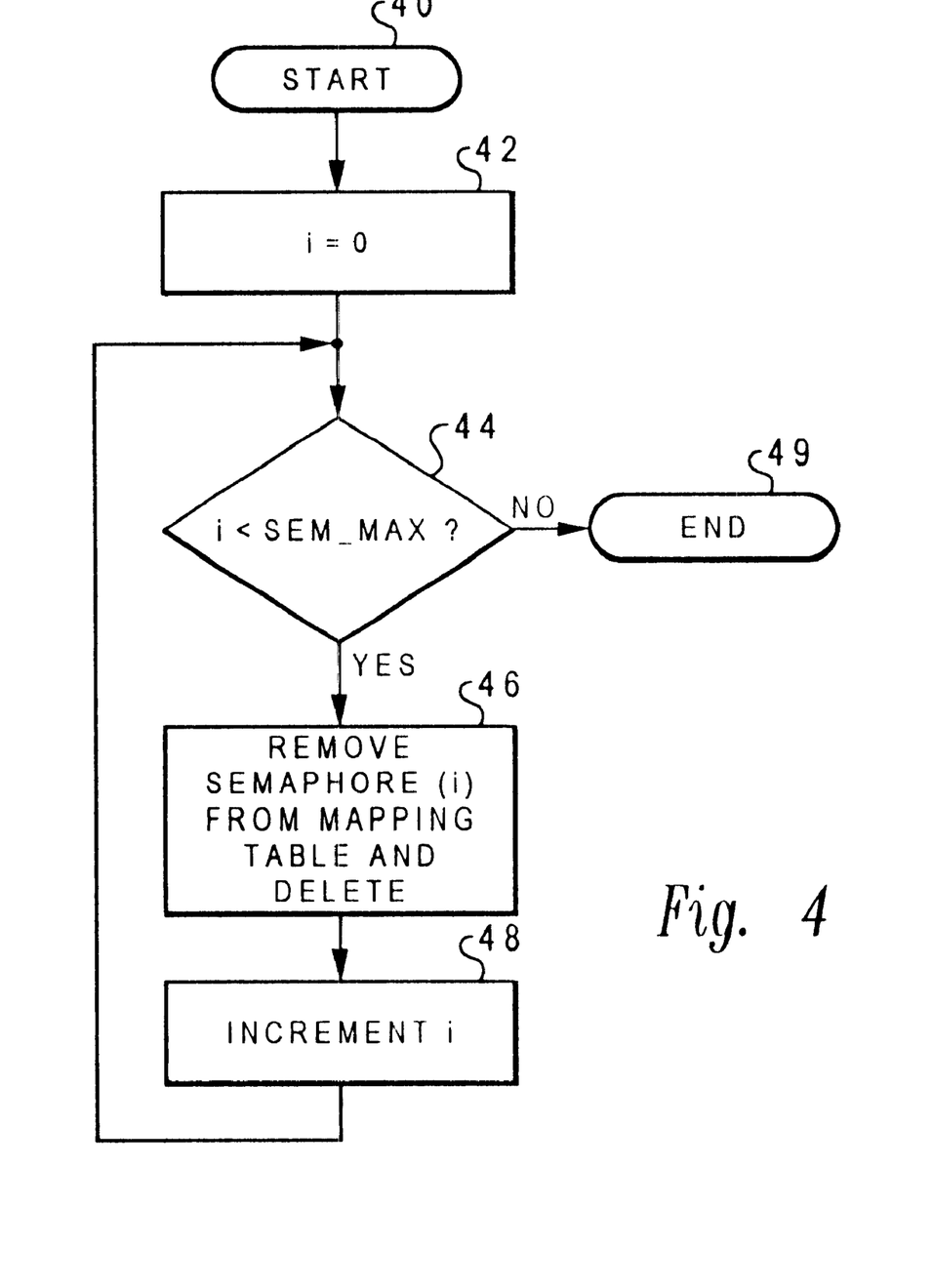
FIG. 4 is a high level logic flow diagram of a destructor method within the semaphore manager according to a preferred embodiment of the invention.

Referring now to FIG. 4, there is depicted a high level logic flow diagram of destructor method for the semaphore manager according to a preferred embodiment of the invention. Starting at block 40, an integer count i is set to zero at block 42. A determination is then made, at block 44, as to whether or not the maximum number of semaphores (SEM__MAX) has been reached. If the maximum number of semaphores has been reached, then the destructor method exits at block 49; otherwise, a semaphore is removed from the mapping table and is deleted at block 46. Finally, the integer count i is incremented at block 48, and the process returns to block 44.

Semaphore Manager Class—Request Semaphore

Figure 5:
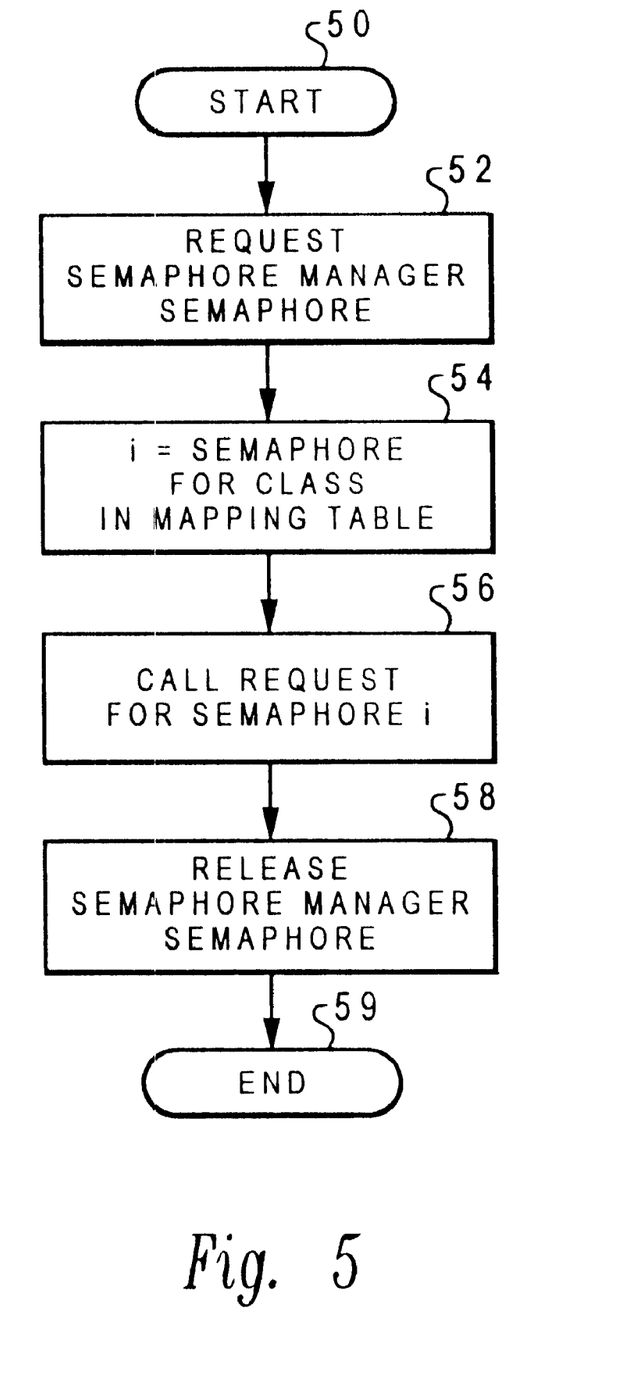
FIG. 5 is a high level logic flow diagram of a semaphore requesting procedure from the semaphore manager according to a preferred embodiment of the invention.

Referring now to FIG. 5, there is depicted a high level logic flow diagram of the semaphore request procedure from the semaphore manager according to a preferred embodiment of the invention. Starting at block 50, a semaphore manager semaphore (semaphore 0) is requested by a process at block 52. This insures no other concurrent processes can access to the semaphore manager. At block 54, constant i is set to equal to a semaphore number for a corresponding class according to the mapping table defined previously. Next, the process calls the request for semaphore i at block 56. Finally, the process releases the semaphore manager semaphore at block 58; and the semaphore request procedure exits at block 59.

Semaphore Manager Class—Release Semaphore

Figure 6:
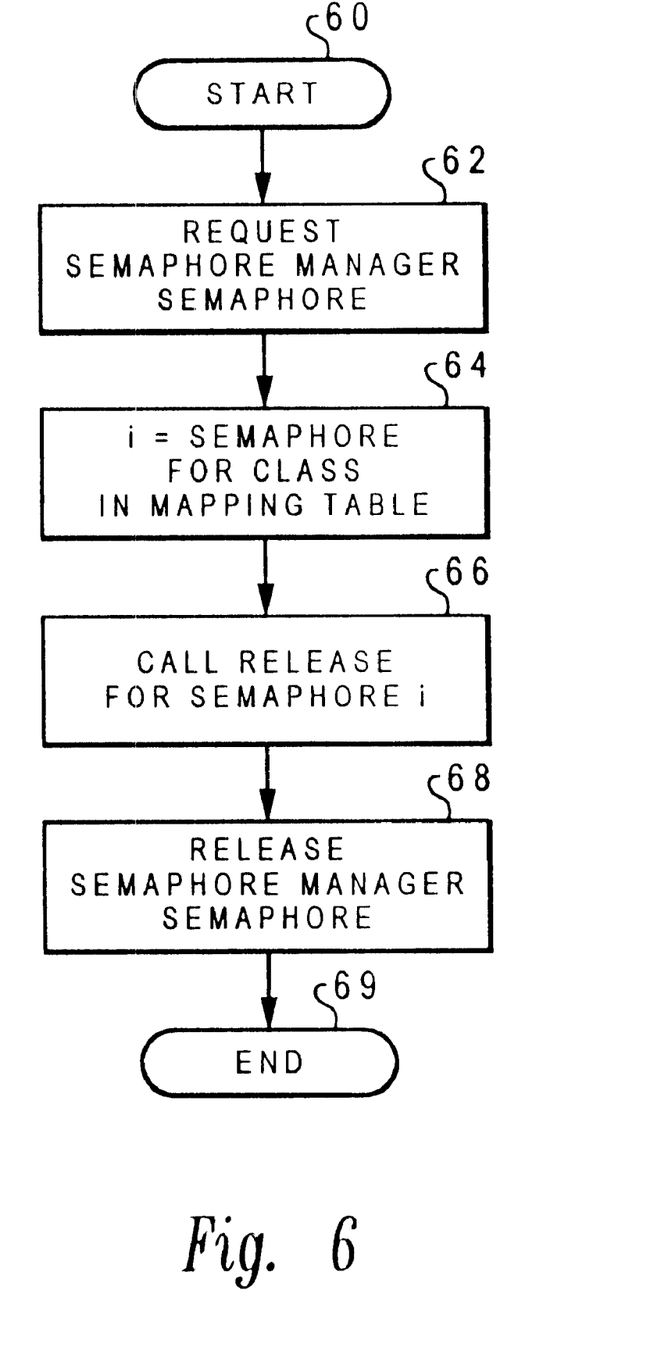
FIG. 6 is a high level logic flow diagram of a semaphore releasing procedure from the semaphore manager according to a preferred embodiment of the invention.

Referring now to FIG. 6, there is depicted a high level logic flow diagram of the semaphore releasing procedure from the semaphore manager according to a preferred embodiment of the invention. Starting at block 60, the process requests a semaphore manager semaphore (semaphore 0) at block 62 to lock out other concurrent processes from accessing the semaphore manager. At block 64, constant i is set to equal to a semaphore number for a corresponding class according to the mapping table defined previously. Next, the process calls the release for semaphore i at block 66. Finally, the process releases the semaphore manager semaphore at block 68; and the semaphore release procedure exits at block 69.

The high level flow diagrams in FIGS. 3, 4, 5 and 6, as described above, only demonstrate the minimal implementation of a semaphore manager according to a preferred embodiment of the invention. More sophisticated error-checking routines, which are well known to a person who is skilled in the art of computer engineering, can be added for situations such as an invalid class index, or only one semaphore is held by any one process at a time in order to reduce potential deadlocking.

As has been described, the present invention provides a flexible method for managing semaphores in a multi-tasking computer system. This invention can be utilized in any object-oriented multi-tasking computing environment to provide a flexible scheme for allocating semaphores to balance multi-tasking concurrency performance and deadlock potential. The present invention has the following advantages. First, the number of actual semaphores can be controlled so that the computer system would not be overwhelmed. Second, the mapping of virtual to physical semaphores can be statically controlled at the time of compilation or dynamically controlled during the time of execution. For example, the semaphore manager can be integrated into a class library, and a user of the class library who creates new derived classes can dynamically incorporate the semaphoring of these new derived classes into the semaphore manager. Potential deadlock situations, which typically exist in a process when it requests more than one semaphore, can be discovered by tracking processes and semaphores utilized by each process. Finally, semaphore debugging is easier because all the semaphores would be requested and released all in one place.

While the invention has been particularly shown and described with reference to a preferred embodiment, it will be understood by those skilled in the art that various changes in form and detail may be made therein without departing from the spirit and scope of the invention.

What is claimed is:

1. A semaphore manager data structure for managing semaphores in a multi-tasking computer system having a storage means, said data structure comprising:

a plurality of indices residing in said storage means, wherein each of said plurality of indices defines a corresponding class;

a plurality of semaphore numbers residing in said storage means, wherein each of said plurality of semaphore numbers defines a corresponding semaphore; and a mapping table residing in said storage means, wherein said mapping table defines an assignment of each of said semaphores to each of said classes by utilizing said plurality of indices and said plurality of semaphore numbers, wherein a class can be assigned to only one semaphore and said semaphore may be concurrently assigned to more than one class.

2. The semaphore manager data structure according to claim 1, wherein only one of said plurality of semaphore numbers which defines a semaphore manager is unique.

3. A multi-tasking data processing system having a semaphore manager data structure in a storage means for managing semaphores, said data processing system comprising:

means for defining a plurality of indices, wherein each of said plurality of indices corresponds to a class;

means for defining a plurality of semaphore numbers, wherein each of said plurality of semaphore numbers corresponds to a semaphore; and means for assigning each of said semaphore to each of said class in a mapping table by utilizing said plurality of indices and said plurality of semaphore numbers, wherein a class can be assigned to only one semaphore and said semaphore may be concurrently assigned to more than one class.

4. The multi-tasking data processing system according to claim 3, wherein said data processing system further comprises:

means for initializing an integer count i;

means for determining whether or not a maximum number of semaphores has been reached;

means for exiting, in response to a determination that said maximum number of semaphores has been reached; and means for creating a new semaphore(i), storing said new semaphore(i) in said mapping table, incrementing said integer count i and returning to said determining means, in response to a determination that said maximum number of semaphores has not been reached.

5. The multi-tasking data processing system according to claim 3, wherein said data processing system further comprises:

means for initializing an integer count i;

means for determining whether or not a maximum number of semaphores has been reached;

means for exiting, in response to a determination that said maximum number of semaphores has been reached; and means for deleting a semaphore(i) from said mapping table, incrementing said integer count i and returning to said determining means, in response to a determination that said maximum number of semaphores has not been reached.

6. The multi-tasking data processing system according to claim 3, wherein said data processing system further comprises:

means for requesting a semaphore manager semaphore by a process;

means for setting a constant i equal to one of said semaphore numbers corresponding to a class, according to said mapping table;

means for calling a request for a semaphore (i) by said process; and means for releasing said semaphore manager semaphore by said process.

7. The multi-tasking data processing system according to claim 3, wherein said data processing system further comprises:

means for calling a release for semaphore (i) by a process.

8. A method for managing semaphores in a multi-tasking data processing system, said method comprising the data processing system implemented steps of:

defining within said data processing system a plurality of indices, wherein each of said plurality of indices corresponds to a class;

defining within said data processing system a plurality of semaphore numbers, wherein each of said plurality of semaphore numbers corresponds to a semaphore; and assigning each of said semaphore to each of said class in a mapping table within said data processing system by utilizing said plurality of indices and said plurality of semaphore numbers, wherein a class can be assigned to only one semaphore and said semaphore may be concurrently assigned to more than one class.

9. The method according to claim 8, wherein said method further includes a constructor-method procedure comprising the data processing system implemented steps of:

initializing within said data processing system an integer count i;

determining within said data processing system whether or not a maximum number of semaphores has been reached;

exiting said constructor method within said data processing system, in response to a determination that said maximum number of semaphores has been reached; and creating a new semaphore(i), storing said new semaphore (i) in said mapping table, incrementing said integer count i and returning to said determining step within said data processing system, in response to a determination that said maximum number of semaphores has not been reached.

10. The method according to claim 8, wherein said method further includes a destructor-method procedure comprising the data processing system implemented steps of:

initializing within said data processing system an integer count i;

determining within said data processing system whether or not a maximum number of semaphores has been reached;

exiting said destructor method within said data processing system, in response to a determination that said maximum number of semaphores has been reached; and deleting a semaphore(i) from said mapping table, incrementing said integer count i and returning to said determining step within said data processing system, in response to a determination that said maximum number of semaphores has not been reached.

11. The method according to claim 8, wherein said method further includes a semaphore request procedure comprising:

requesting within said data processing system a semaphore manager semaphore by a process;

setting within said data processing system a constant i equal to one of said semaphore numbers corresponding to a class, according to said mapping table;

calling within said data processing system a request for a semaphore (i) by said process; and releasing within said data processing system said semaphore manager semaphore by said process.

12. The method according to claim 8, wherein said method further includes a semaphore release procedure comprising:

requesting within said data processing system a semaphore manager semaphore by a process;

setting within said data processing system a constant i equal to one of said semaphore numbers corresponding to a class, according to said mapping table;

calling within said data processing system a release for semaphore (i) by said process; and releasing within said data processing system said semaphore manager semaphore by said process.

13. A computer program product having a semaphore manager data structure for managing semaphores in a multi-tasking computer system, said computer program product comprising:

a computer usable medium including:

computer program code means representing a plurality of indices, wherein each of said plurality of indices defines a corresponding class;

computer program code means representing a plurality of semaphore numbers, wherein each of said plurality of semaphore numbers defines a corresponding semaphore; and computer program code means representing a mapping table, wherein said mapping table defines an assignment of each of said semaphores to each of said classes by utilizing said plurality of indices and said plurality of semaphore numbers, wherein a class can be assigned to only one semaphore and said semaphore may be concurrently assigned to more than one class.

14. The computer program product according to claim 13, wherein only one of said plurality of semaphore numbers which defines a semaphore manager is unique.

* * * * *